No. 608,239. Patented Aug. 2, 1898.
A. WAKEFIELD.
SANITARY OR OTHER PIPE.
(Application filed Oct. 18, 1897.)
(No Model.)
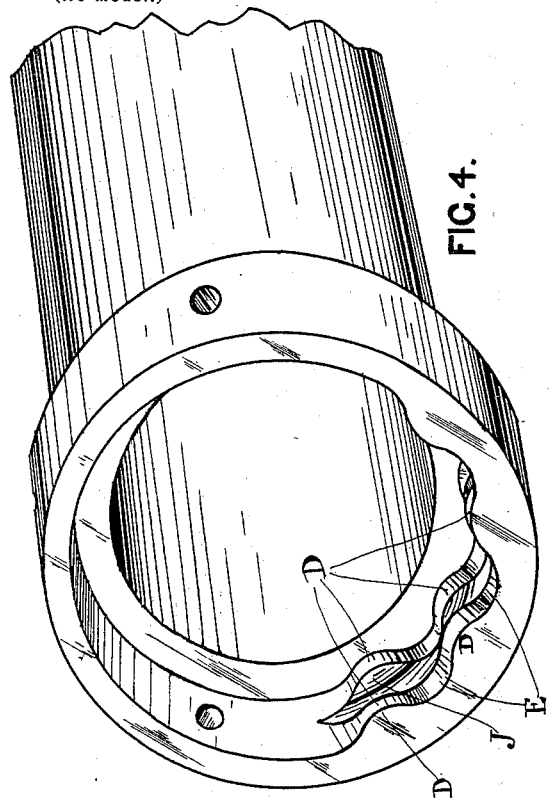
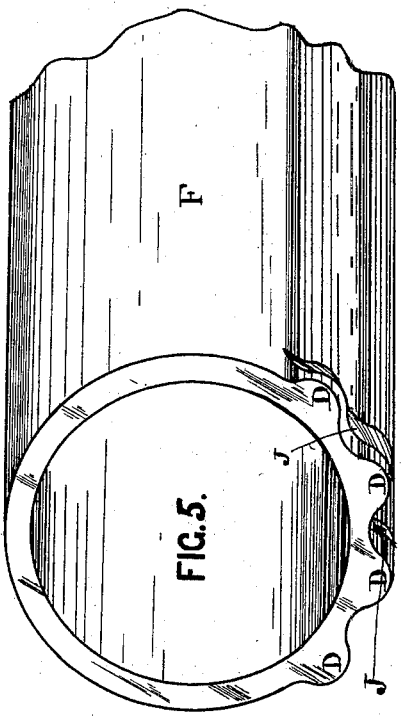
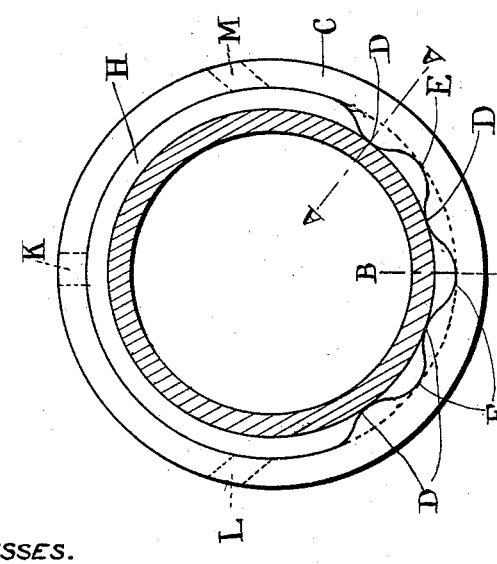
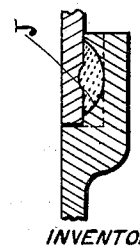
WITNESSES.
Harry Gee.
James Lerris
INVENTOR.
Arthur Wakefield.
BY
ATTORNEYS.
THE NORRIS PETERS CO., PHOTO-LITHO., WASHINGTON, D. C.

UNITED STATES PATENT OFFICE.

ARTHUR WAKEFIELD, OF LONDON, ENGLAND.

SANITARY OR OTHER PIPE.

SPECIFICATION forming part of Letters Patent No. 608,239, dated August 2, 1898.

Application filed October 18, 1897. Serial No. 655,591. (No model.)

*To all whom it may concern:*

Be it known that I, ARTHUR WAKEFIELD, of 39 Victoria street, Westminster, London, England, have invented certain new and useful Improvements in Sanitary or other Pipes; and I do hereby declare the following to be a full, clear, and exact description of the invention, such as will enable others skilled in the art to which it appertains to make and use the same.

In laying continuous lengths of socketed earthenware sanitary pipes it is difficult to maintain a true level or gradient throughout the entire length by reason of the bedding of the spigot end of the following pipe in the socket being imperfect, there being no absolutely solid and unyielding point or points on which the said spigot end may rest, the usual bed being either cement or a strand of hemp or the like embedded in clay or otherwise or other equivalent devices.

Now the object of my invention is to so form the socket of the pipe that the spigot end of the next pipe may have certain and fixed points of support in addition to the usual cement or other bedding or filling, so that a true and effective level or grade may be secured for the invert. I attain this object by molding the pipe to a special shape (whether molded in plastic material or cast in a mold) according to either one or the other of the two forms shown upon the accompanying drawings, in which—

Figure 1 is an end view of the socket of a pipe prepared according to the form of my invention which I prefer to employ, together with a cross-section of the spigot end of the following pipe; Fig. 2, a section through line A A, and Fig. 3 a section through line B B, of Fig. 1. Fig. 4 is a perspective view of this form of pipe, showing corrugations and a transverse furrow within the socket. In Fig. 5 I have illustrated the alternative form of my invention by a perspective view of the spigot portion bearing longitudinal corrugations on its outside crossed by a transverse furrow near to the extremity.

I mold the bedding or lower portion of the socket C of the pipe into a series of short corrugations E E E, running in the direction of the length of the pipe—say to the number of three or more—the points or ridges D D D D formed by such corrugations E E E rising to a circumferential line corresponding with the lower or outer circumference of the spigot F, thus forming points D D of certain and unyielding support for the same, the bed now presenting a ridge-and-valley formation. The operation so far may be easily accomplished in an ordinary pipe-mill by suitably shaping the die of the socket-mold to produce the required corrugations. The internal face of the corrugations at their lowest points will correspond with the usual contour of the socket, the remainder H of which, together with the valleys E E E of the corrugated portion, is filled with cement in the usual way for the purpose of making a close joint. After the pipe (assuming it to be of plastic material) has left the mold I cut or plow through the ridges formed, as before described, with a transverse or circumferential furrow J, Figs. 2 and 4, (or more than one furrow,) so leaving a number of certain points—say eight or more—on which the spigot end may rest, and is thereby prevented from sinking into the cement which forms the bedding and surrounds the spigot end.

It is obvious that if the pipe is to be made by casting the furrow J must be produced by the mold simultaneously with the pipe itself.

For the purpose of more readily pouring in the cement filling, and so making an effective joint, I form, say, three holes in the socket, one, K, at the crown and one at each side, L M, at about one-third of the depth of the pipe, or thereabout, and when several pipes are duly laid in position and clayed up I pour in the liquid cement through the two side holes, or one of them, until the space is filled up to the position of the said side holes, which are then clayed up, and when the cement is set, or nearly so, I fill up the remaining portion through the hole in the crown, thus insuring a thorough joint without the use of mastic or other linings.

According to the alternative form of my invention instead of corrugating the socket, as before described, I may leave the socket plain and corrugate the lower portion or one side of the outer surface of the pipe throughout the whole or a portion of its length (or the whole outer surface of the pipe may be corrugated, if desired) and transversely corrugate the spigot end of these corrugations to obtain a similar result, as shown by Fig. 5.

Having now described my invention, what I claim as new, and desire to secure by Letters Patent, is—

1. In earthenware and like sanitary pipes a horizontally and internally corrugated (or partially-corrugated) socket having the ridges of such corrugations furrowed centrally or thereabout in the transverse or circumferential direction of the socket substantially as set forth in the foregoing specification.

2. A sanitary or other like pipe having a horizontally-corrugated or partially-corrugated socket furrowed transversely or circumferentially and provided with three holes namely one at the crown and one at each side for pouring in cement substantially as hereinbefore set forth.

In testimony whereof I affix my signature in presence of two witnesses.

ARTHUR WAKEFIELD.

Witnesses:
JAMES LEWIS,
HARRY GEE.